United States Patent
Donly (10) Patent No.: US 11,579,320 B2
(45) Date of Patent: Feb. 14, 2023

(54) TSUNAMI DETECTION SYSTEM WITH DATA STORAGE DEVICES IN AUTONOMOUS UNDERWATER VEHICLES

(71) Applicant: Seagate Technology LLC, Fremont, CA (US)

(72) Inventor: Charles Donly, Minneapolis, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 485 days.

(21) Appl. No.: 16/853,946

(22) Filed: Apr. 21, 2020

(65) Prior Publication Data

US 2020/0348429 A1  Nov. 5, 2020

Related U.S. Application Data

(60) Provisional application No. 62/843,177, filed on May 3, 2019.

(51) Int. Cl.
| | |
|---|---|
| *G01V 1/00* | (2006.01) |
| *G05D 1/04* | (2006.01) |
| *G01V 1/38* | (2006.01) |
| *G05D 1/00* | (2006.01) |

(52) U.S. Cl.
CPC ............ *G01V 1/008* (2013.01); *G01V 1/3808* (2013.01); *G05D 1/048* (2013.01); *G05D 1/0088* (2013.01)

(58) Field of Classification Search
CPC ...... G01V 1/008; G01V 1/3808; G05D 1/048; G05D 1/0088
See application file for complete search history.

(56) References Cited

U.S. PATENT DOCUMENTS

| | | | |
|---|---|---|---|
| 7,693,663 B2 | 4/2010 | Friedlander et al. | |
| 8,284,072 B1* | 10/2012 | Ruffa | G08B 21/10 702/14 |
| 9,036,452 B2 | 5/2015 | Rikoski | |
| 9,853,744 B2* | 12/2017 | Damus | H04B 13/02 |
| 10,067,507 B2 | 9/2018 | Davoodi et al. | |
| 2008/0021657 A1* | 1/2008 | Barkal | G01V 1/008 702/14 |
| 2014/0053768 A1 | 2/2014 | Brizard | |

OTHER PUBLICATIONS

Simonite, Tom, "Hard Drive Wobbles Track Earthquake Spread", Article, New Scientist, Sep. 8, 2006, 2 pages.
Andrews Christopher, "IBM Master Inventors Patent Early Warning System", IBM Research bulletin, Oct. 4, 2010, 3 pages.
Bernard et al., "Early detection and real-time reporting of deep-ocean tsunamis", Research Gate Article, NOAA/Pacific Marine Environmental Laboratory, Jan. 1999, 13 pages.

* cited by examiner

*Primary Examiner* — Elias Desta
(74) *Attorney, Agent, or Firm* — Westman, Champlin & Koehler, P.A.

(57) ABSTRACT

A method of underwater tsunami detection includes detecting a trigger event using disruption of at least one of a plurality of hard disk drives (HDDs), each different one of the plurality of HDDs in a different one of a plurality of autonomous underwater vehicles (AUVs). A time and location of each of the at least one HDD for the trigger event is logged. Based on at least one of the HDD disruptions, times, and locations of the at least one HDD of the plurality of HDDs, a size, strength, and direction of a tsunami caused by the trigger event is determined. Information regarding the tsunami is transmitted to a monitoring station.

20 Claims, 7 Drawing Sheets

TSUNAMI DETECTION SYSTEM WITH DATA STORAGE DEVICES IN AUTONOMOUS UNDERWATER VEHICLES

CROSS-REFERENCE TO RELATED APPLICATION

This non-provisional utility patent application claims the benefit of U.S. Provisional Patent application No. 62/843,177, filed on May 3, 2019, the entire content of which is hereby incorporated by reference.

SUMMARY

In one embodiment, a method of underwater tsunami detection includes detecting a trigger event using disruption of at least one of a plurality of hard disk drives (HDDs), each different one of the plurality of HDDs in a different one of a plurality of autonomous underwater vehicles (AUVs). A time and location of each of the at least one HDD for the trigger event is logged. Based on at least one of the HDD disruptions, times, and locations of the at least one HDD of the plurality of HDDs, a size, strength, and direction of a tsunami caused by the trigger event is determined. Information regarding the tsunami is transmitted to a monitoring station.

In another embodiment, an underwater tsunami detection system includes a plurality of hard disk drives (HDDs) each configured to be disposed in one of a plurality of autonomous underwater vehicles (AUVs), and a communication network between the plurality of HDDs and a monitoring station. A navigation system provides position information for each of the plurality of HDDs. A detection module on each of the plurality of HDDs is configured to detect a trigger event using hard disk drive (HDD) disruption, log a time and location of the disruption in each of the HDDs that detects a disruption, determine based on at least one of the HDD disruption, time, and position, a size, strength, and direction of a tsunami caused by the trigger event, and transmit information on the communication network regarding the tsunami to the monitoring station.

In another embodiment, an autonomous underwater vehicle includes a vehicle body with a propulsion system, a communication system, an internal navigation system, and a computer-control for directing vehicle operation, and a hard disk drive (HDD) with disturbance detection. The HDD is configured to detect and log a disruption associated with a tsunami, and upon detection, to effect transmission of information regarding the disruption to a monitoring station.

This summary is not intended to describe each disclosed embodiment or every implementation of tsunami detection using data storage devices as described herein. Many other novel advantages, features, and relationships will become apparent as this description proceeds. The figures and the description that follow more particularly exemplify illustrative embodiments.

DETAILED DESCRIPTION OF ILLUSTRATIVE EMBODIMENTS

Embodiments of the present disclosure provide an autonomous underwater vehicle (AUV), or an interconnected number of AUVs, using a hard disk drive or drives (HDDs) in the AUVs) to detect and transmit information on disruptions detected in the ocean. The information on disruptions allows for prediction of tsunamis in real time, and allows, for example, for determination of speed, amplitude, strength, location, and direction of travel.

In one embodiment, the AUVs are arrayed in ocean locations, but are movable and have communication capabilities networked with other AUVs in the array. This ability to move autonomously, along with a communications network between multiple AUVs, allows for surfacing of an individual AUV to send alert messages to, for example, a shore- or surface-based platform or warning center. Alternatively, the communication network may be used for sending alert messages to another networked AUV allowing a closest, or most quickly surfaceable, AUV to surface to transmit an alert.

Detected disturbances from more than one AUV HDD may be compared and/or analyzed to detect, and to improve determination of, for example, size, strength, and direction of an underwater wave that may become a tsunami. Other underwater disturbances could also be detected and analyzed or reported by the embodiments of the disclosure.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Many tsunami detection apparatus disposed in oceans are single purpose, fixed location devices such as surface based detection buoys or underwater fixed position tsunameters. These detectors are positioned where it is believed underwater events that may lead to tsunamis are likely to occur. Their fixed positions make them reliable for potential detection at some points, but lack the ability to be moved without large undertakings. Surface detection remains somewhat difficult because tsunami oscillation in deep water may only displace sea level by centimeters to a meter.

Land-based tsunami detection systems may give little warning since an energy release that may cause a tsunami takes time to travel to shore. Further, land-based detection systems have no way of actually knowing whether a tsunami exists and/or a reliable time frame for when it might reach land. Land-based earthquake detection and location may provide some information as to whether a tsunami is likely, but is also unreliable as to timing, impact location, strength, and the like. Still further, typical analysis of vibration for land-based detection does not operate in real time, and so its immediate predictive ability is small.

All types of waves, including tsunamis, have characteristics, including wavelength, period or frequency, wave height, velocity, amplitude, and wave height. Wavelengths for tsunamis are quite large compared to wind-generated ocean waves, with wavelengths, the distance between two identical points on a wave, ranging from about 10-500 kilometers (km) or more, compared to around 100-200 meters (m) for wind-generated ocean waves. The wave period is the time it takes for a full wave to pass a stationary point. Wave frequency is the inverse of period. Wave periods for tsunamis are often on the order of 10 minutes to two hours, versus on the order of 15-20 seconds for wind-generated ocean waves. Wave height is this distance between a trough of the wave and a peak or crest of the wave. Wave amplitude is the height of the wave above the water line, and is typically on the order of half the height. Wave amplitude, wavelength, height, period and velocity are shown in graphical form in FIG. 1.

Waves generally move at a velocity (v) given by the formula:

$$v = \lambda/p$$

where $\lambda$ is the wavelength, and p is the period of the wave (also the inverse of the frequency). Typical wind-generated ocean waves move at a velocity on the order of 90 km/hour.

Tsunamis act as shallow water waves. A wave is considered a shallow water wave when the ratio of the water depth to the wavelength is very small (wavelength on the order of 25 or more times the water depth). Velocity (v) of shallow water waves is related to the water depth and is given by the formula:

$$v = \sqrt{gH}$$

where v is wave velocity, g is gravity acceleration (~9.8 m/s$^2$), and H is the water depth.

In the deep ocean, mean water depth is about 4000 m, so a tsunami will travel at V=$\sqrt{4000*9.8}$, or about around 200 m/s, or over 700 km/h.

For tsunamis that are generated by underwater earthquakes, volcanic eruptions, landslides, and the like, the amplitude of the tsunami is determined by the amount by which the sea-floor is displaced. Similarly, the wavelength and period of the tsunami are determined by the size and shape of the underwater disturbance.

The rate at which a wave loses energy is inversely related to its wavelength. Since a tsunami has a very large wavelength, it loses little energy as it propagates. Thus, in very deep water, a tsunami will travel at high speeds with little loss of energy. With an average ocean depth of just under 3,700 m, average tsunami velocity will be on the order of 685 km/hour. Large parts of oceans are considerably deeper. In 6000 m deep water, a tsunami travels at over 870 km/hour.

As a tsunami leaves the deep water of the open sea and arrives at the shallower waters near the coast, it undergoes a transformation. Since the velocity of the tsunami is related to the water depth, as the depth of the water decreases, the velocity of the tsunami decreases. The amount of total energy of the tsunami, however, remains largely constant.

Figure 2:
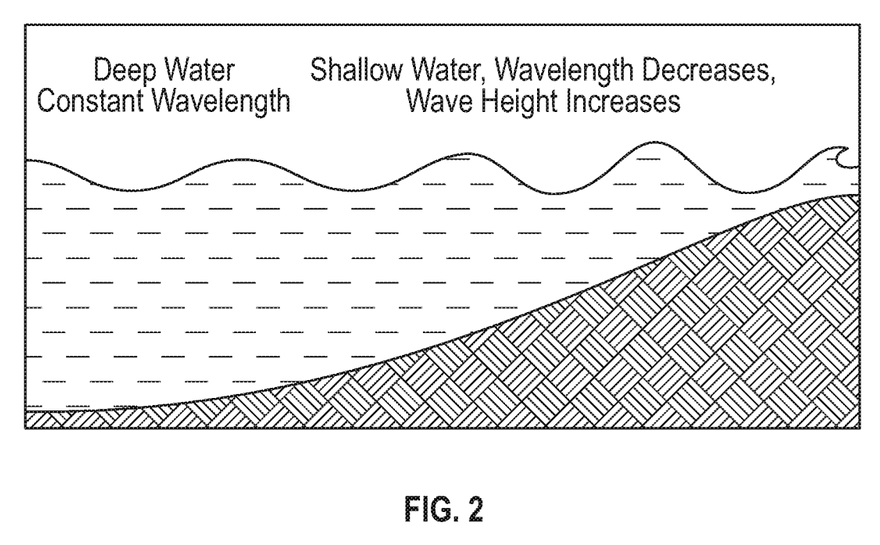
FIG. 2 is a graphic illustrating compression of wavelength of a tsunami as the water depth gets smaller.

Since the period of the wave remains the same, more water is forced between the wave crests causing the height of the wave to increase in what is referred to as wave shoaling. The wavelength decreases, and wave height increases. Because of this shoaling effect, a tsunami that is largely imperceptible in deep water may grow to have wave heights of several meters or more. The compression of wavelength of a tsunami as the water depth gets smaller is shown in graphical form in FIG. 2.

If the trough, or low water point, of the tsunami wave reaches the coast first, this causes a phenomenon called drawdown, where it appears that sea level has dropped considerably. Drawdown is followed immediately by the crest of the wave which can catch people observing the drawdown off guard. If the crest of the wave hits the coast first, sea level rises, which is called run-up. Run-up is usually expressed in meters above normal high tide. Run-ups from the same tsunami can be variable because of the influence of the shapes of coastlines. Tsunamis may reach a maximum vertical height onshore above sea level, called a run-up height, of 30 meters.

Frequency determinations based on disturbances may be detected by HDDs in the UAVs of the present disclosure. Range of frequency calculations are shown for typical velocities, wavelengths, and times below.

$$f = v/\lambda$$

For a tsunami propagating in water 6000 meters deep, for example, the velocity is 870 km/hour. With a wavelength of 500 km, the frequency is:

$f$=870 km/hr/500 km=1.74 per hour=4.8×10$^{-4}$ Hertz (Hz), or 0.48 miiliHz (mHz).

Periods may be used to generate frequency as well:

$$f = 1/p$$

For a tsunami with a period of 10 minutes, the frequency is:

$f$=1/10 minutes=0.1 per minute=1.7 mHz

For a tsunami with a period of two hours, the frequency is:

$f$=1/2 hours=0.5 per hour=0.14 mHz

An embodiment for detecting a trigger event indicative of a tsunami, such as detecting singular and plural disturbances in an HDD, is as follows. Analyzing and tracking the presence and amount of an external disturbance is used in this embodiment for each HDD in each AUV. When the AUVs communicate with one another, they coordinate the data of the disturbances, such as the time received, the location of the HDD, the amount and nature of the disturbance, and the like. Using a plurality of HDDs in a plurality of AUVs in an array allows for the determination of the speed and direction of travel of tsunami waves.

Figure 3:
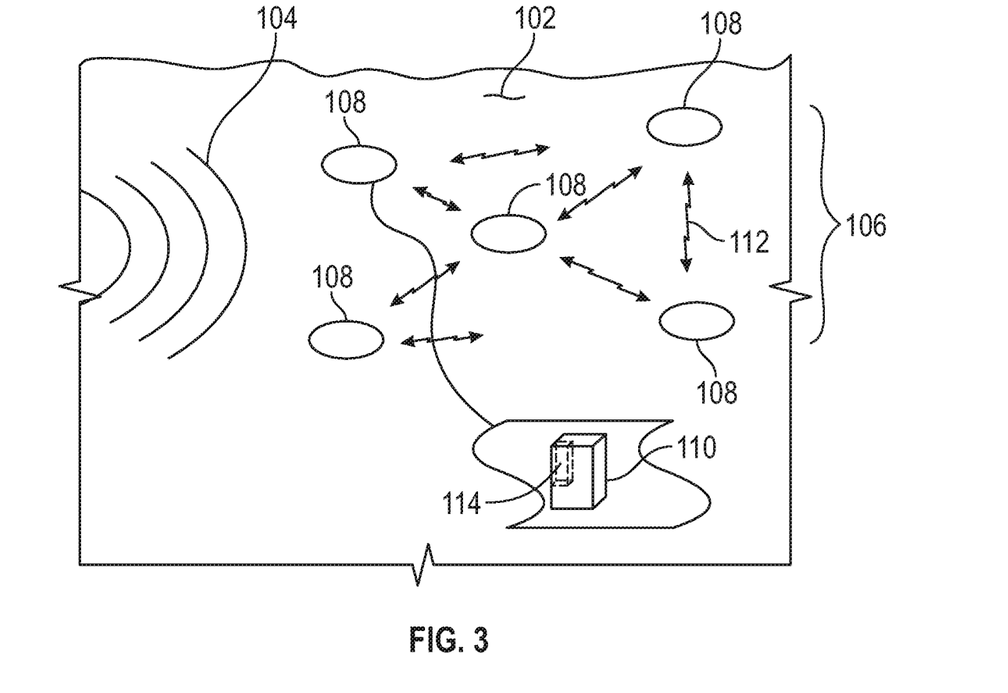
FIG. 3 is an illustration of an environment for an underwater tsunami detection system according to an embodiment of the present disclosure.

Referring to FIG. 3, an environment 100 is shown. An ocean or other body of water 102 has a tsunami wave 104 propagating therein. An array 106 of AUVs 108 is positioned within the ocean 102. Each AUV carries a data storage device such as HDD 110. Each data storage device 110 has its own sensor or set of sensors 114. The AUVs 108 are synched to known locations and times, through a common time kept either through navigation or a communication network 112 between the AUVs, and through a navigation system such as a global positioning system (GPS) or the like.

A servo off-track detection system may be used in one embodiment for determination and categorization of underwater disturbances. AUVs 108 having onboard HDDs 110 with sensors for detecting vibrations are employed in embodiments of the present disclosure. Servo off-track detection uses the path of a servo head along tracks to identify and quantize disturbances. Typically, the disturbances are corrected to assist in effective writing of data to the HDD. In the embodiments of the present disclosure, the disturbances and environment are noted and analyzed, such as for amount, frequency, time, location, depth in the ocean, and the like. In one embodiment, the time and location of the disturbance is logged in the AUV 108 or the AUV's data storage devices 110, for example, using a system clock and inertial navigation of the AUV.

This data is used in conjunction with data from other HDDs 110 in other AUVs 108 synchronized to each other as to distance. The data may be used to determine the size, strength, speed, direction, and location pf an underwater disturbance such as a tsunami. The sensor for the tsunami wave uses an already available and powered data storage device (or the components located therein) onboard an AUV.

AUVs 108 (single or multiple) in the ocean are exposed to the energy of underwater disturbances such as earthquakes, volcanic eruptions, landslides, and the like. The onboard sensors of the HDDs detect and provide the data for tsunami identification and classification.

In another embodiment, the presence and amount of an external disturbance comprising a low frequency wave is detected using a rotational vibration (RV) sensor. Such a sensor comprises in one embodiment an accelerometer in an HDD to detect vibration outside the HDD. The detector is used to feed forward information about the disturbance to protect off track motion of a recording head of the HDD. In this embodiment, the RV sensor detects vibration due to underwater waves rocking or otherwise disturbing the AUV in which the HDD is mounted.

In another embodiment, the presence and amount of an external disturbance comprising a low frequency wave is detected using a position error signal (PES) on an HDD. Detecting using the PES signal comprises in one embodiment feeding the PES signal directly from a recording head stack assembly of the HDD to a frequency detector such as a fast Fourier transform (FFT), and measuring a difference between a commanded position and an actual position as measured by a servo sector written on media of the HDD. The detection modules are configured in one embodiment to detect a trigger event in a predetermined frequency bandwidth.

Upon detecting a triggering event, and real-time completion of the analysis thereof, in one embodiment a tsunami detecting AUV 108 surfaces and sends a message using, for example, over the air communication (e.g., via a satellite). Alternatively, an AUV 108 sends a message without surfacing to an intermediary device or another AUV in the communication network, containing the detection and analysis information. That intermediary device or other AUV then passes the information on to end users, such as by surfacing as described above, or through any communication network available to the intermediary device or other AUV. In one embodiment, only the raw data is passed along, and analysis is performed at the intermediary device, or at a remote analysis station or operation. Nevertheless, the information is passed along quickly, either by the AUV detecting the tsunami surfacing, or another AUV in the network surfacing to provide the information or analysis to observers. The message may be compressed or otherwise encrypted.

Figure 1:
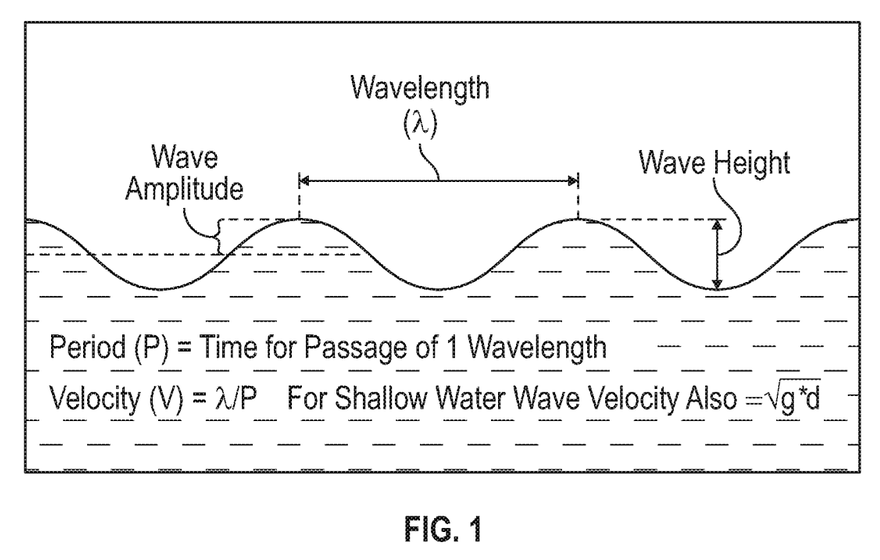
FIG. 1 is a graphic illustrating wave amplitude, wavelength, height, period and velocity.

In other embodiments, multiple AUVs are able to communicate with each other to compare possible detected triggering data in their data storage devices to improve the accuracy of detection. For example, as shown in FIG. 1, a tsunami wave 104 passes different AUVs at different times. The identification of a tsunami frequency or other disturbance by the various data storage devices 110 of the various AUVs 108 allows for a time-dependent analysis of the event, and allows for the determination of speed and direction of the tsunami. Data processing of single or multiple signals sent would then be mapped for analysis and detection of the size, strength, and direction of the tsunami, for example. Further, multiple AUVs with data storage devices corroborating an event and an ensuing tsunami provides a check on a single detection that may be caused by a disturbance that is only local in nature.

Tsunami detection is not an exact science, as the current detection methods are only estimates, and are subject to further interpretation or speculation as to the size, speed, strength, and direction of a tsunami. Details of the underwater event that has occurred are not always know, and it is those details that typically improve the prediction of tsunamis. However, embodiments of the present disclosure use actual detected disturbances within an array of AUVs carrying data storage devices to accurately identify and inform about tsunamis in real time.

The types of disturbances that indicate a tsunami are specific waves. Tsunamis have low frequencies, as has been shown above. The storage devices are tuned to identify and detect these low frequency disturbances to determine characteristics of a tsunami.

The array 106 of AUVs (or nodes) positioned at known but movable locations around the ocean allows for the benefit of agreement that a tsunami is occurring. AUVs a known distance apart and synchronized in communication and time allows for the interpretation of events at multiple points and times within the array to track and determine characteristics of a tsunami. Such an array 106 provides the benefit of being able to identify and reject a false positive trigger event detection by one AUV, or even several closely spaced AUVs, while providing a higher confidence when an actual tsunami is present.

In order to more easily detect the types of disturbances associated with underwater tsunami waves and energy, the sensors and disruption methods used in the data storage devices may be, in one embodiment, tuned to detect within certain frequency bands, such as in the mHz range where tsunami waves reside. Further, as the displacements tend to be small but have high energy, bandwidth observation may be used to more clearly identify the types of disturbances that are associated with tsunamis.

Figure 4:
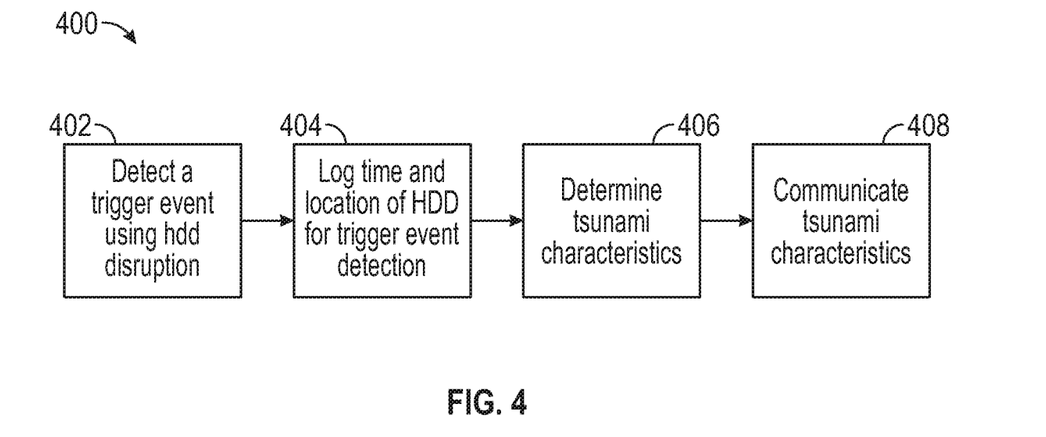
FIG. 4 is a flow chart diagram of a method according to an embodiment of the present disclosure.

FIG. 4 is a flow chart diagram of a method 400 for underwater tsunami detection. Method 400 comprises in one embodiment, detecting a trigger event, using disruption of at least one of a plurality of hard disk drives (HDDs) in separate an autonomous underwater vehicles (AUVs) in block 402. The time and location of each of the at least one HDD for the trigger event is logged in block 404. In block 406, at least one of the HDD disruptions, times, and locations of the at least one HDD of the plurality of HDDs are used to determine a size, strength, and direction of a tsunami caused by the trigger event. Information regarding the tsunami is transmitted to a monitoring station in block 408.

Figure 5:
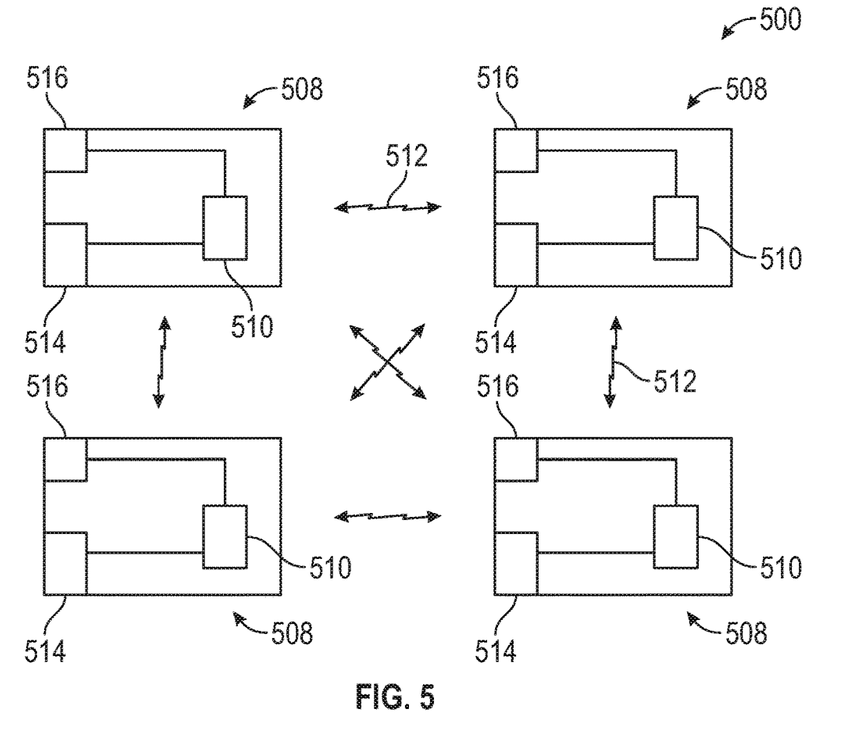
FIG. 5 is a block diagram of an underwater tsunami detection system according to an embodiment of the present disclosure.

FIG. 5 is a block diagram of an underwater tsunami detection system 500, comprising a plurality of hard disk drives 510 each configured to be disposed in one of a plurality of autonomous underwater vehicles 508, and a communication network 512 between the plurality of AUVs 508. Each AUV has a navigation system 516 providing position information for each of the plurality of HDDs. Each HDD has a detection module 514, in the form of one or more sensors or computer software/hardware configured to detect disruptions associated with underwater events. Each detection module 514 is configured to detect, using hard disk drive (HDD) disruption, a trigger event, to log a time and location of the disruption in each of the at least one AUVs, to determine based on at least one of the HDD disruption, time, and position, a size, strength, and direction of a tsunami caused by the trigger event, and to transmit information on the communication network regarding the tsunami to a monitoring station.

As has been discussed herein, tsunami buoys are generally tethered to the ocean floor, and may be placed in water deeper than 3000 m to ensure the observed signal is not contaminated by other types of waves that have shallower effects (e.g. surface wind-generated waves). A tsunami buoy is triggered into an "event mode" when a pressure sensor thereon first detects a faster moving seismic wave moving through the sea floor. The buoy then commences reporting sea level information at, for example, one minute intervals to enable rapid verification of the possible existence of a tsunami.

In contrast, in another embodiment, a tsunami detection method is based on architecture of an AUV, and not on detection of disruptions in a HDD. The AUV method replaces the tethered buoy pressure sensor method with a comparison between sensors on an AUV, such as Doppler velocity log (DVL) or pressure sensor, with internal navigation system (INS) information. This method is able to quickly detect a difference in position compared to existing methods.

Figure 6:
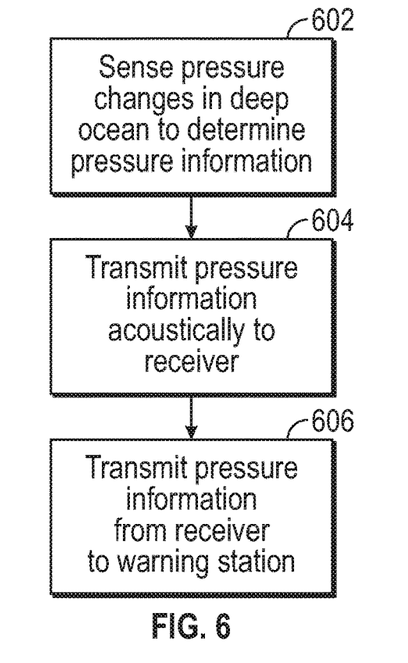
FIG. 6 is a flow chart diagram of a method according to an embodiment of the present disclosure.

In one embodiment, a non hard drive detection method 600 is shown in FIG. 6. Method 600 is based on sensing pressure and movement changes in the deep ocean using existing sensors in block 602, and then transmitting that information acoustically (e.g., using an underwater acoustic modem) to a receiver on the surface in block 604. Then, in block 606, the information is transmitted to a common collection location (e.g., a warning center).

In this AUV embodiment, multiple AUVs are employed. The multiple AUVs are not tethered to the seafloor. Sensing pressure changes as discussed above comprises sensing depth versus isotherm change in one embodiment by comparing a significant pressure difference (P(n+1) versus P(n)) over time interval (n+1) against an AUV internal navigational unit. Internal navigation units typically have an accuracy of approximately 0.05% to 0.2% in a straight line.

For a tsunami wave with a wavelength of 200 km travelling at 750 km/hour, the wave period is about 16 minutes. As has been mentioned, ocean waves with a wavelength of about 100 m have a period of about 5-20 seconds, or about 1/10 the periodicity of tsunami waves. In one embodiment, a band-pass filter in the mHz range is suitable for sorting out a frequency spike (via a fast Fourier transform (FFT)) of a tsunami versus a wind generated wave having a higher frequency. In another embodiment, the AUVs also or additionally determine X/Y position change by DVL vs INS accuracy.

An example of tsunami detection takes as a baseline a local magnitude 7.3 (moment magnitude 8.6) earthquake that occurred on Apr. 1, 1946, near Unimak Island in the Aleutian Islands west of Alaska, near the Alaska Trench.

At landfall, the resulting tsunami travelled at a speed of about 47 km/hr and had a height of about 18 m. Ocean velocity based on average ocean depth was about 659 km/hr (about 183 m/s). At an ocean velocity of 659 km/hr, compared to an average AUV speed of about 4 km/hr (2 knots), and using an INS accuracy of 0.2%, AUV movement due to tsunami wave is 183 m/s versus an INS accuracy of 0.22 meters. Using a reasonable gauge capability of 4 sigma, 0.88 meters of AUV movement is sufficient to gauge the AUV being out of place compared to the INS. This will take place in approximately 4.85 msec. During that time, an AUV at 4 km/hr will have traveled about 1 mm (vs. almost 1 m above).

In 1 second, the wave travels 183 m versus an expected 0.22 meter (22 cm) error band for the AUV during that 1 second. Therefore, the off track course will be readily identifiable when comparing the INS (and its predicted position) against the DVL (actual position moved of the AUV moved by the tsunami referenced to the ocean bottom). The platform can therefore detect aberrant movement from a tsunami in as little of 4.85 ms with 99.994% accuracy, and can be verified with multiple samples within a second (for example) to reject false positives (alpha error).

In comparison to an wind surface ocean wave, on the surface an ocean wave has a period of about 5-10 seconds and a height of 3-15 meters. Its velocity is about 0.1 km/5 sec*3600 sec/hr=72 km/hr. At 72 km/hr (20 m/s), it will take 22.5 seconds for a wind based wave to move an AUV 0.9 meters vs. 4.85 msec to detect a tsunami.

Figure 7:
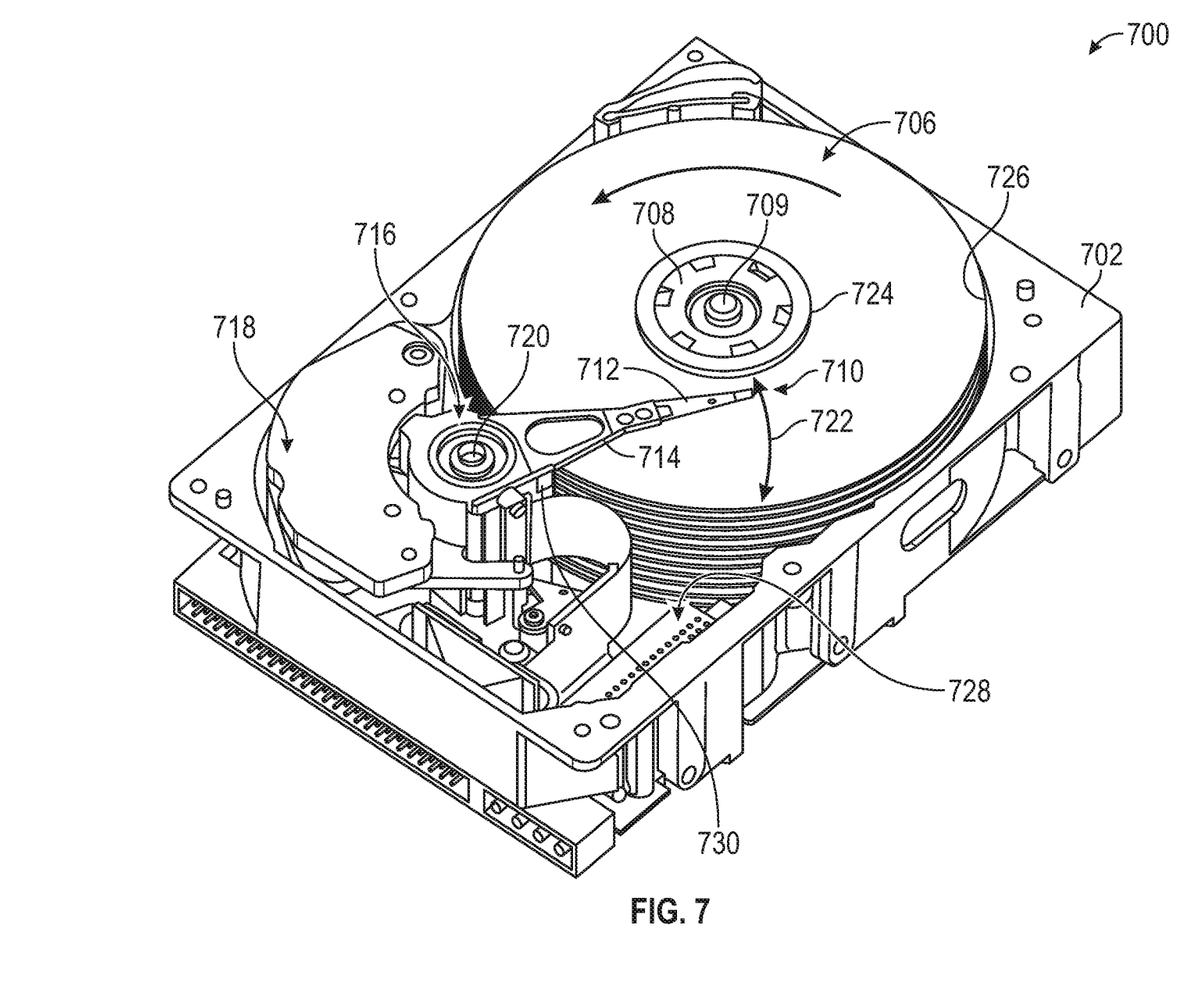
FIG. 7 illustrates an embodiment of a data storage device in which embodiments of the present application can be used.

FIG. 7 shows an illustrative operating environment in which certain embodiments disclosed herein may be incorporated. The operating environment shown in FIG. 7 is for illustration purposes only. Embodiments of the present disclosure are not limited to any particular operating environment such as the operating environment shown in FIG. 7. Embodiments of the present disclosure are illustratively practiced within any number of different types of operating environments.

Referring now to FIG. 7, a perspective view of an example HDD 700 in which at least some of the present embodiments are useful is shown. HDD 700 includes a housing with a base 702 and a top cover (not shown). HDD 700 further includes a disc pack 706, which is mounted on a spindle motor (not shown) by a disc clamp 708. Disc pack 706 includes a plurality of individual discs which are mounted for co-rotation about central axis 709. It should be noted that, in some embodiments, a single disc instead of a plurality of discs may be used.

Each disc surface has an associated slider 710 which is mounted in HDD 700 and carries a read/write head for communication with the disc surface. In the example shown in FIG. 7, sliders 710 are supported by suspensions 712 which are in turn supported by track accessing arms 714 of an actuator 716. The actuator shown in FIG. 7 is of the type known as a rotary moving coil actuator and includes a voice coil motor (VCM), shown generally at 718. Other types of actuators can be used, such as linear actuators.

Voice coil motor 718 rotates actuator 716 with its attached sliders 710 about a pivot shaft 720 to position sliders 710 over a desired data track along a path 722 between a disc inner diameter 724 and a disc outer diameter 726. Voice coil motor 718 operates under the control of a closed-loop servo controller within internal circuitry 728 based on position information, which is stored on one or more of the disc surfaces within dedicated servo fields. The servo fields can be interleaved with data sectors on each disc surface or can be located on a single disc surface that is dedicated to storing servo information. As slider 710 passes over the servo fields, the read/write head generates a readback signal, which in turn is used to generate position error signals (PES) that identify the location of the head relative to the center line of the desired track. Based on the PES, actuator 716 moves suspension 712 to adjust the head's position so that it moves toward the desired position. Once the transducing head is appropriately positioned, servo controller 728 then executes a desired read or write operation. RV sensor 730 is positioned to sense vibration in the HDD. Rotational vibration sensor 730 output is used in one embodiment to provide information about detected vibration in the HDD due to tsunami waves. This information is used in one embodiment as a check on detection of tsunami waves by other methods. For example, when vibration is detected, it may be fed to an analyzer that filters frequencies, and when frequency detection indicative of a tsunami is detected, a bit is set in a tsunami detection signal sent as discussed elsewhere herein. Such a signal or bit may be used in conjunction with other detection of a potential tsunami to serve as checking for false positive detections of other methods.

For example, when an external measurement of a positional shift in an AUV is detected, such as a vertical movement indicated by pressure sensors, or an X-Y movement anomaly detected by, for example, an INS or the like, a check of the rotational vibration sensor 730 output is made. The allows comparison either partially in real-time or later in further analysis information on vibration detected by the rotational vibration sensor 730. The information, both external and internal, may be encoded in one embodiment in a message communicated to another AUV in the network or to a monitoring station or the like. Further, the message may include rotational vibration information such as a bit or bits indicative of the detection of rotational vibration. In one embodiment, a number of rotational vibration indications over a determined time period may be included in the message and may be provided.

Figure 8:
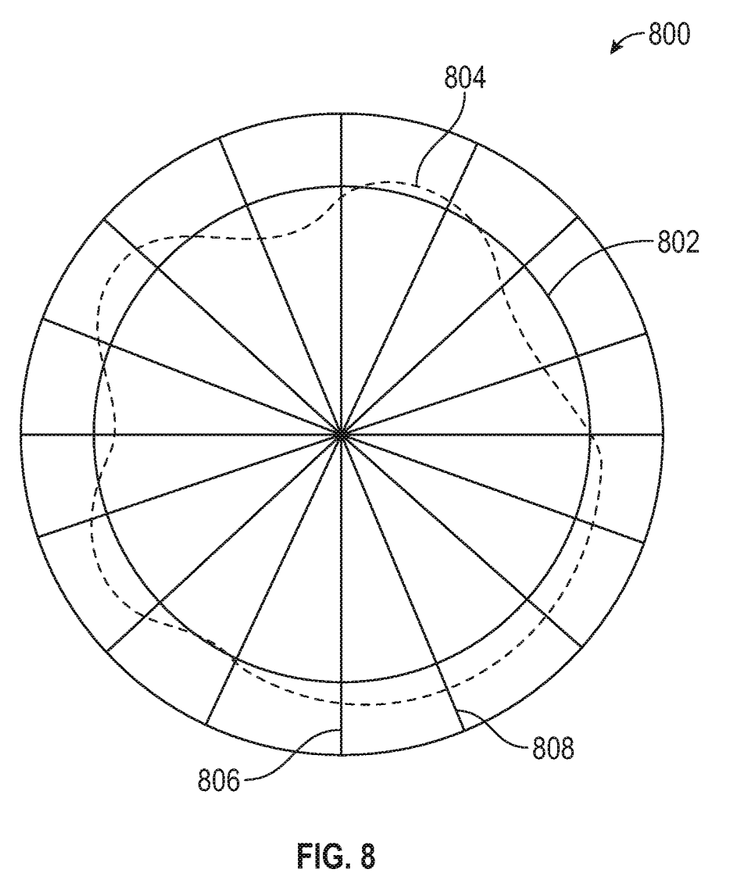
FIG. 8 is a top view of a disc pack of the data storage device of FIG. 7.

Referring now to FIG. 8, a top view of a disc of disc pack 706 (of FIG. 7) having a disc surface 800 with a circular track 802 is shown. Disc surface 800 includes a plurality of radially extending servo fields such as servo fields 806 and 808. The servo fields include servo information that identifies the location of track 802 on disc surface 800.

In one embodiment, any variation in the position of a head away from circular track 802 is considered a position error. Dashed line 804 illustrates an example path that the head could take in the presence of vibration-induced position errors, when the errors are left uncorrected. Vibration-induced disturbances, which result in head position errors and servo PES, can be categorized as either repeatable or non-repeatable runout errors (RRO and NRRO, respectively), and are typically manifested as frequency components of the PES. RRO errors are repetitive in nature (usually over each disc revolution) whereas NRRO errors occur more or less randomly over time. Tsunamis would result in relatively large NRRO errors at certain frequencies.

Figure 9:
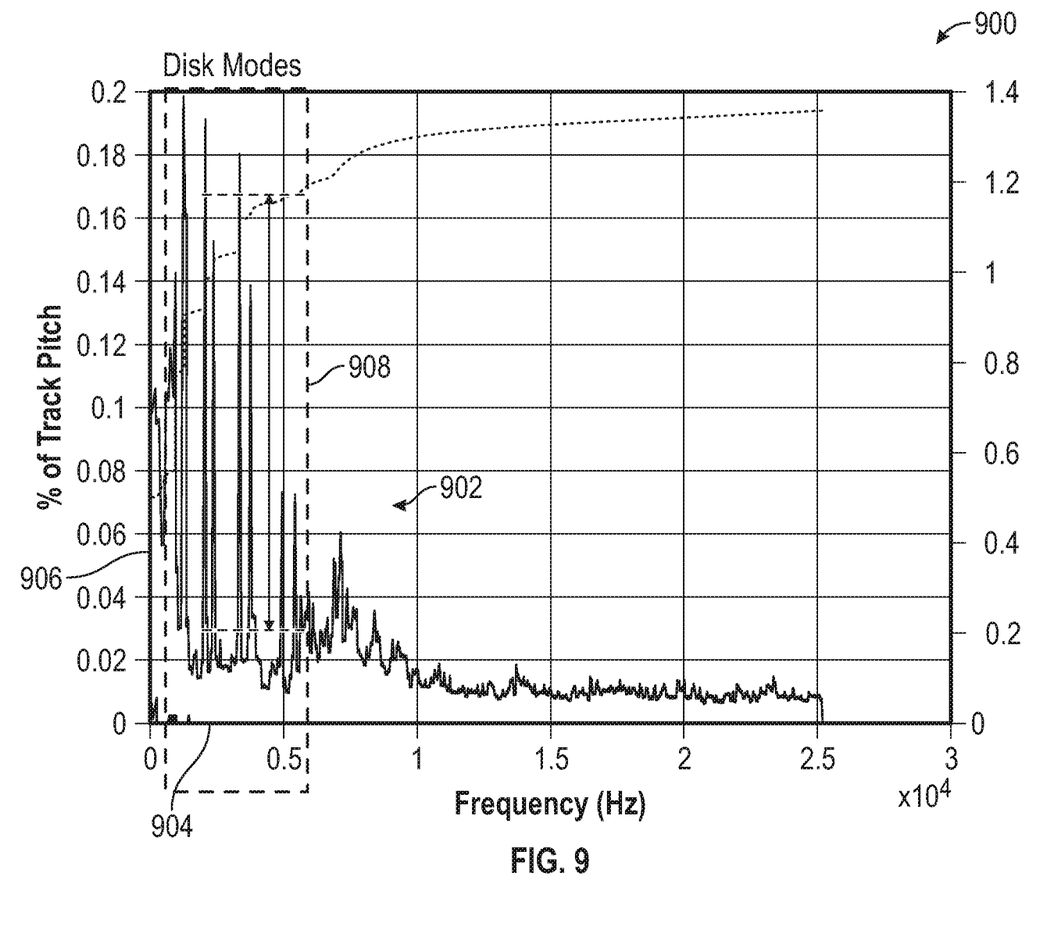
FIG. 9 is a graph that includes a plot of non-repeatable runout values in an example hard disc drive (HDD)

FIG. 9 is a graph 900 that includes a plot 902 of NRRO values in an example HDD. In graph 900, horizontal axis 904 represents frequency in Hertz (Hz) and vertical axis 906 represents percentage of track pitch. The portion of plot 902 within bock 908 represents NRRO due to vibration caused by a tsunami. In general, to address NRRO, one or more filters may be employed.

Figure 10:
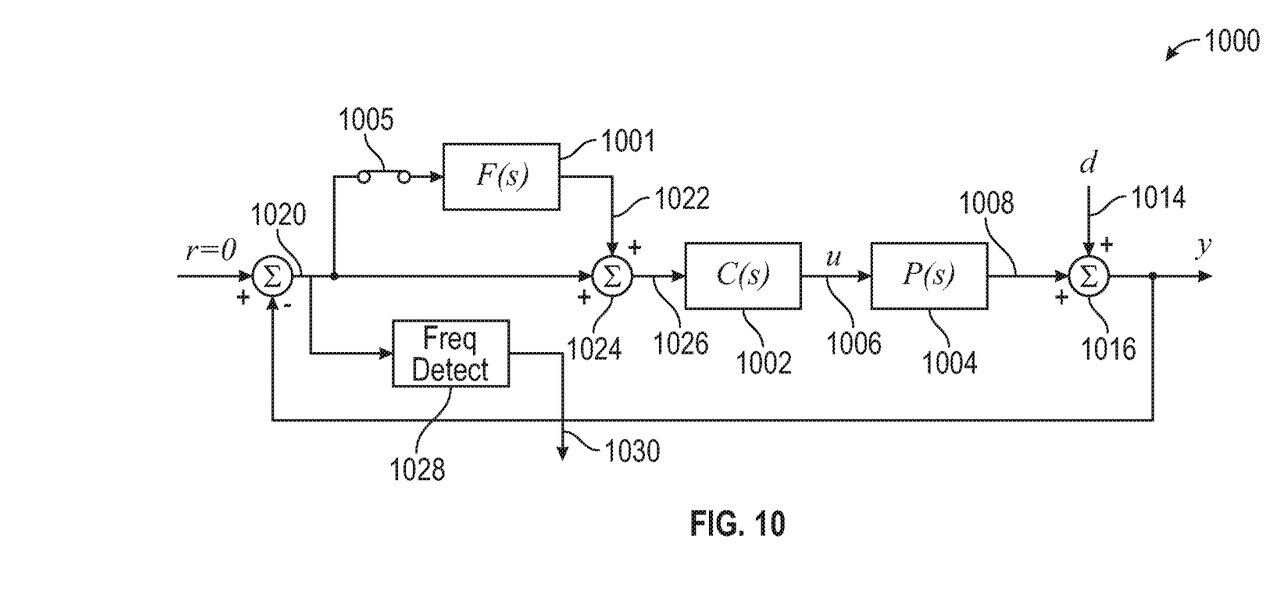
FIG. 10 is a simplified block diagram of a servo loop that may be employed in the data storage device of FIG. 7.

FIG. 10 is a simplified block diagram of a servo loop 1000 of a disc drive such as 700 in which one or more filters (F(s)) 1001 are employed. Servo loop 1000 includes servo controller 1002 represented by C(s) and a plant (e.g., disc drive actuator mechanics) 1004 represented by P(s). Servo controller 1002 may be a part of servo controller circuitry within internal circuit 728 of FIG. 7. Drive actuator mechanics 1004 may include actuator assembly 716, voice coil motor 718, track accessing arm 714, suspension 712, and sliders 710, all of FIG. 7. In some embodiments, drive actuator mechanics may also include one or more microactuators (not shown) for fine positioning of sliders 710.

Servo controller 1002 generates a servo control signal (e.g., a control current) u 1006 that drives the voice coil motor of drive actuator 1004. In embodiments that include a microactuator, the servo control signal 1006 may include a control voltage that is supplied to the microactuator. In response to receiving the servo control signal 1006, the drive actuator 1004 produces head motion 1008. Disturbances 1014 are added to head motion 1008 at summing node 1016 to produce signal y. Disturbances d at 1014 are located at harmonic frequencies due to disc motion and other vibrations. When the head moves, servo fields on the disc may be read and therefore the head motion 1008 or signal y include a servo signal or servo measurement signal indicative of a position/location of the head. The servo measurement signal is subtracted from a reference signal r, which may be generated by internal circuitry 728 based on a desired location of the head. Subtracting the servo measurement signal from reference signal r produces a raw PES 1020. Raw PES 1020 is provided to the filter(s) 1001 that responsively output a vibration-cancellation signal 1022. Vibration-cancellation signal 1022 is provided to summing node 1024 at which the raw PES 1020 and the vibration-cancellation signal 1022 are summed. The summing of signals 1020 and 1022 results in a refined PES 1026, which is provided to servo controller 1002. Upon receiving the refined PES 1026, as indicated above, the servo controller 1002 generates the servo control signal 1006 that drives the voice coil motor of drive actuator 1004. The removal of vibration by the one or more filters helps with accuracy of the servo control signal 1006, thereby improving track following by a head (not shown in FIG. 10). A switch 1005 of any suitable type may be included to turn the filters on and off as desired.

In parallel with filtering the PES 1420 with filter 1001, the PES 1020 is also provided to a frequency detector 1028. In one embodiment, frequency detector 1028 is a fast Fourier transform (FFT). The frequency detector output is provided at 1030 to contribute to a message such as that described above. In one embodiment, tsunami detection using the frequency detector 1028 and external measurements are combined in a single signal. For example, a two bit signal of "00" may indicate no tsunami detection, whereas a "11" signal indicates detection by both the frequency detector and external measurements. If only one of the detections is positive for a tsunami, the signal may be "01" or "10". In further embodiments, additional information is encoded into the message using more bits, such as the number of detections by the frequency detector 1028, as well as information on the amount of external detected movement, or both. Also, as noted above, information signals or bits may be provided by rotational vibration sensor 730. It should be understood that any information detected regarding a tsunami may be encoded into a message to be sent, subject to bandwidth and speed limitations of underwater communication systems.

In another embodiment, a tsunami detection method includes comparing a pressure difference (P(n+1) versus a pressure P(n)) over a time interval (n+1) in an autonomous underwater vehicle (AUV) against an AUV internal navigational unit to sense pressure changes in an ocean over the time interval. The pressure change information is transmitted (e.g., acoustically) to a receiver on surface of the ocean. From the receiver, the pressure change information is transmitted to a common collection location from the receiver. Pressure change is taken as a difference between a first pressure at time n (P(n)) and a second pressure at time n+1 (P(n+1)). In one embodiment, the method further includes sensing movement of the AUV versus an internal navigation unit expected movement to determine variation in movement due to an underwater wave. In another embodiment, the method further includes detecting, in parallel with a pressure difference, a trigger event using disruption of at least one rotational vibration sensor in at least one of the plurality of hard disk drives (HDDs) in the AUV. A time and location of each of the at least one HDD is logged for the trigger event. Based on at least one of the HDD disruptions, times, and locations of the at least one HDD of the plurality of HDDs, a size, strength, and direction of a tsunami caused by the trigger event is determined. The information regarding the tsunami is transmitted to the common collection location with the pressure change information.

In another embodiment, a data storage device includes a data storage medium, a head, a sensor located in the head, and a frequency detector. The sensor is configured to sense servo information located on the disc and produce a servo signal therefrom, the servo signal combined with a reference signal to produce a PES. The frequency detector receives the PES and determines whether disturbance frequencies in the PES are indicative of a tsunami, and provides a tsunami indication output when the disturbance frequencies in the PES are indicative of the tsunami. In another embodiment, the data storage further includes a rotational vibration sensor configured to detect vibrations indicative of a tsunami, and to provide a tsunami indication output when the detected vibrations are indicative of the tsunami.

The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of underwater tsunami detection, comprising:
    detecting a trigger event using disruption of at least one of a plurality of hard disk drives (HDDs), each different one of the plurality of HDDs in a different one of a plurality of autonomous underwater vehicles (AUVs);
    logging a time and location of each of the at least one HDD for the trigger event;
    determining based on at least one of the HDD disruptions, times, and locations of the at least one HDD of the plurality of HDDs, a size, strength, and direction of a tsunami caused by the trigger event; and
    transmitting information regarding the tsunami to a monitoring station.

2. The method of claim 1, wherein the HDDs are synchronized to a common time.

3. The method of claim 1, wherein the location of each of the plurality of HDDs is determined by a position determining system for the AUV associated with each HDD.

4. The method of claim 1, wherein detecting comprises detecting a low frequency disturbance at the HDD.

5. The method of claim 4, wherein detecting the low frequency disturbance is accomplished using a servo off-track disruption determination.

6. The method of claim 4, wherein detecting the low frequency disturbance is accomplished using an accelerometer based detection.

7. The method of claim 6, wherein detecting with the accelerometer based detection comprises detecting using a rotational vibration (RV) sensor.

8. The method of claim 7, wherein detecting using the RV sensor comprises detecting vibration outside the HDD, and feeding forward information about the disturbance for measurement thereof to a frequency detector to determine presence of tsunami induced vibration.

9. The method of claim 4, wherein detecting a low frequency disturbance comprises detecting using a position error signal (PES).

10. The method of claim 9, wherein detecting using the PES comprises:
    feeding the PES directly from a recording head stack assembly of the HDD, and
    measuring a difference between a commanded position and an actual position as measured by a servo sector written on media of the HDD.

11. The method of claim 1, wherein detecting a trigger event is performed in a predetermined frequency bandwidth.

12. An underwater tsunami detection system, comprising:
    a plurality of hard disk drives (HDDs) each configured to be disposed in one of a plurality of autonomous underwater vehicles (AUVs);
    a communication network between the plurality of HDDs and a monitoring station;
    a navigation system providing position information for each of the plurality of HDDs; and
    a detection module on each of the plurality of HDDs, the detection module configured to:
        detect a trigger event using HDD disruption;
        log a time and location of the disruption in each of the HDDs that detects a disruption;
        determine based on at least one of the HDD disruption, time, and position, a size, strength, and direction of a tsunami caused by the trigger event; and
        transmit information on the communication network regarding the tsunami to the monitoring station.

13. The underwater tsunami detection system of claim 12, wherein the communication network maintains a common time.

14. The underwater tsunami detection system of claim 12, wherein each detection module is further configured to detect a low frequency disturbance at the HDD.

15. The underwater tsunami detection system of claim 14, wherein each detection module is configured to detect the low frequency disturbance using a servo off-track disruption determination.

16. The underwater tsunami detection system of claim 15, wherein each detection module is configured to detect a low frequency disturbance by:
    detecting using a position error signal (PES);

feeding the PES directly from a recording head stack assembly of the HDD to a frequency detector for detection of a tsunami frequency vibration, and measuring a difference between a commanded position and an actual position as measured by a servo sector written on media of the HDD.

17. The underwater tsunami detection system of claim 14, wherein each detection module is configured to detect the low frequency disturbance using rotational vibration (RV) sensor.

18. The underwater tsunami detection system of claim 17, wherein each detection module is configured to detect using the RV sensor by detecting vibration outside the HDD, and feeding forward information about the disturbance for measurement thereof.

19. The underwater tsunami detection system of claim 12, wherein each detection module is configured to detect a trigger event in a predetermined frequency bandwidth.

20. An autonomous underwater vehicle, comprising:

a vehicle body with a propulsion system, a communication system, an internal navigation system, and a computer-control for directing vehicle operation; and a hard disk drive (HDD) with disturbance detection, the HDD configured to detect and log a disruption associated with a tsunami, and upon detection, to effect transmission of information regarding the disruption to a monitoring station.

\* \* \* \* \*